(12) United States Patent
Wu et al.

(10) Patent No.: US 6,504,711 B2
(45) Date of Patent: Jan. 7, 2003

(54) MODULAR PORTABLE COMPUTER

(75) Inventors: Yu-Ho Wu, Tao-Yuan Hsien (TW); Chia-Chen Ho, Tao-Yuan Hsien (TW); Po-Wei Shih, Tao-Yuan Hsien (TW)

(73) Assignee: Cirkitech Electronic Co., Ltd., Tao-Yen Hsien (TW)

( * ) Notice: Subject to any disclaimer, the term of this patent is extended or adjusted under 35 U.S.C. 154(b) by 99 days.

(21) Appl. No.: 09/832,537

(22) Filed: Apr. 11, 2001

(65) Prior Publication Data

US 2002/0085352 A1 Jul. 4, 2002

(30) Foreign Application Priority Data

Jan. 2, 2001 (TW) .................................. 090200046 U

(51) Int. Cl.⁷ ................................................ G06F 1/16
(52) U.S. Cl. ...................... 361/687; 361/683; 361/724
(58) Field of Search ................................ 361/683–687, 361/724, 725, 728–730, 736–738, 752

(56) References Cited

U.S. PATENT DOCUMENTS

| | | | | |
|---|---|---|---|---|
| 5,734,550 A | * | 3/1998 | Penniman et al. | ........... 361/687 |
| 5,973,920 A | * | 10/1999 | Altic et al. | ................... 361/687 |
| 6,101,094 A | * | 8/2000 | Kermaani et al. | ........... 361/720 |
| 6,166,908 A | * | 12/2000 | Samaras et al. | ............. 361/700 |
| 6,212,069 B1 | * | 4/2002 | Janik et al. | .................. 361/687 |

* cited by examiner

*Primary Examiner*—Darren Schuberg
*Assistant Examiner*—Yean-Hsi Chang
(74) *Attorney, Agent, or Firm*—Brinks Hofer Gilson & Lione

(57) ABSTRACT

A modular portable computer includes a base board unit, an inner frame member and a casing unit. A processor socket and at least one memory socket are mounted on a first surface of the base board unit and are connected electrically thereto. The processor socket has a processing unit mounted removably thereon and connected electrically thereto. The memory socket has a respective memory module mounted removably thereon and connected electrically thereto. The inner frame member is superimposed on the first surface of the base board unit, and includes a heat-dissipating portion, a fan-mounting cavity, a heat-dissipating fan mounted in the fan-mounting cavity, and a heat-conducting pipe having one end disposed to contact the processing unit and an opposite end connected to the heat-dissipating portion so as to transmit heat generated by the processing unit to the heat-dissipating portion. The casing unit confines a compartment that receives assembly of the base board unit and the inner frame member therein, and permits a signal input/output connector set on the base board unit to be accessible externally of the casing unit. The casing unit is formed with a receiving space that receives a data storage medium therein.

8 Claims, 5 Drawing Sheets

MODULAR PORTABLE COMPUTER

BACKGROUND OF THE INVENTION

1. Field of the Invention

The invention relates to a portable computer, more particularly to a portable computer having a modular construction.

2. Description of the Related Art

A conventional desktop computer has a relatively large size and is relatively heavy, and is thus inconvenient to carry outdoors. Portable computers, such as notebook computers, have grown in popularity in recent years in view of their smaller size and lighter weight, which make it possible to carry the same conveniently from one place to another. However, unlike desktop computers, it is very inconvenient and somewhat difficult to upgrade conventional notebook computers. In addition, it is not uncommon for some users to connect stand-alone computer monitors and computer keyboards to conventional notebook computers, especially when the computer monitors and computer keyboards that were originally built into the conventional notebook computers do not meet the user's size requirements.

SUMMARY OF THE INVENTION

Therefore, the main object of the present invention is to provide a modular portable computer that can be upgraded with relative ease and that can be connected to different input/output peripheral equipment according to the user's requirements.

According to the present invention, a modular portable computer comprises a base board unit, an inner frame member and a casing unit.

The base board unit has a first printed circuit surface and a second printed circuit surface opposite to the first printed circuit surface. The first printed circuit surface has a processor socket and at least one memory socket mounted thereon and connected electrically thereto. The processor socket has a processing unit mounted removably thereon and connected electrically thereto. The memory socket has a respective memory module mounted removably thereon and connected electrically thereto. The base board unit further has a signal input/output connector set mounted thereon and connected electrically to at least one of the first and second printed circuit surfaces.

The inner frame member is superimposed on the first printed circuit surface of the base board unit, and includes a heat-dissipating portion, a fan-mounting cavity, a heat-dissipating fan mounted in the fan-mounting cavity, and a heat-conducting pipe having one end disposed to contact the processing unit and an opposite end connected to the heat-dissipating portion so as to transmit heat generated by the processing unit to the heat-dissipating portion. The heat-dissipating fan is operable so as to blow cooling air toward the heat-dissipating portion.

The casing unit includes an upper casing part and a lower casing part connected removably to the upper casing part. The upper and lower casing parts cooperates to confine a compartment that receives assembly of the base board unit and the inner frame member therein, and permit the signal input/output connector set to be accessible externally of the casing unit so as to permit connection of external peripheral equipment to the signal input/output connector set. The lower casing part is formed with a receiving space that receives a data storage medium therein. The data storage medium is connected electrically to the base board unit.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENT

Referring to FIGS. 1 to 5, the preferred embodiment of a modular portable computer according to the present invention is shown to comprise a base board unit 1, an inner frame member 2 and a casing unit 3.

Figure 1:
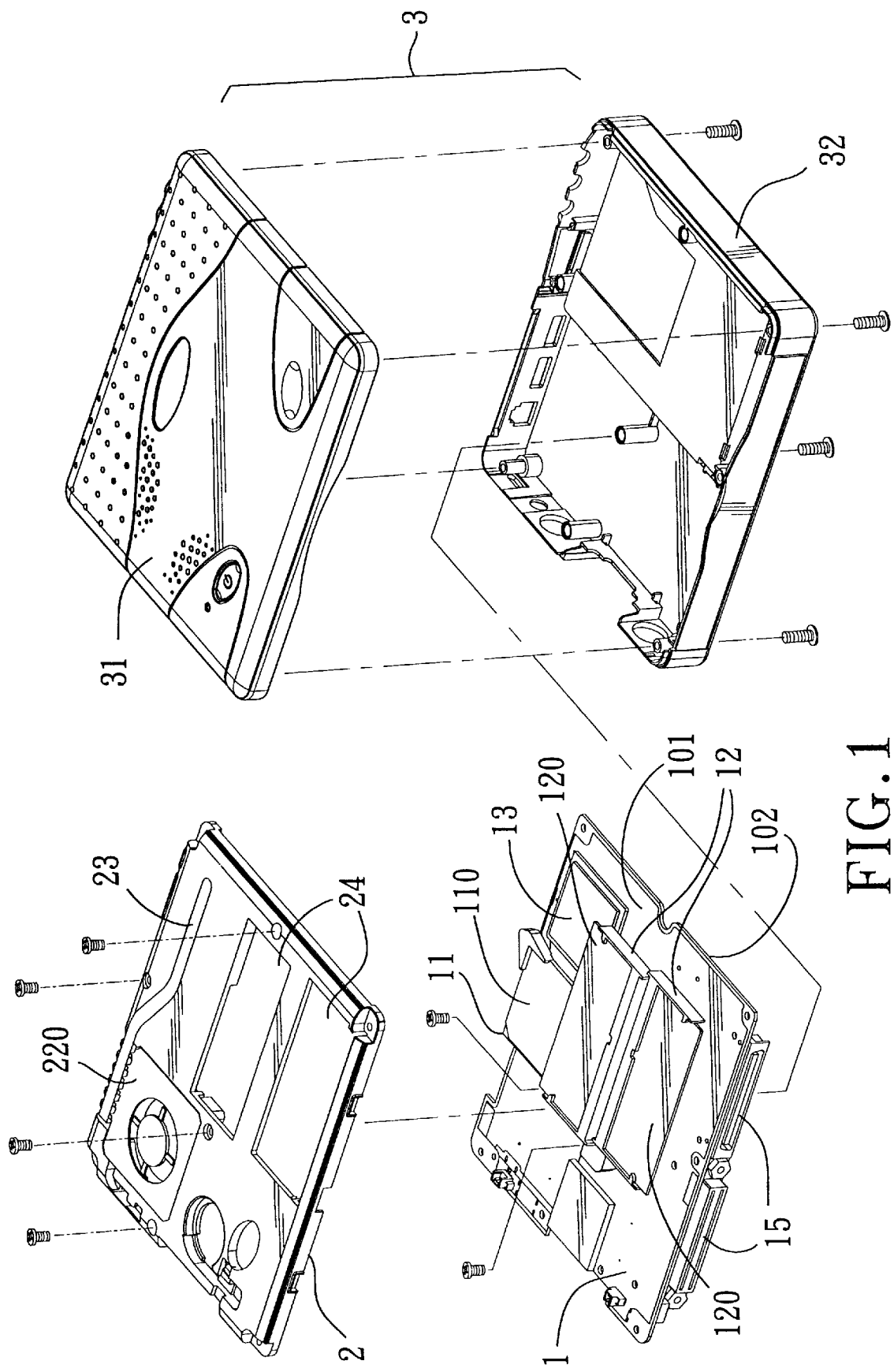
FIG. 1 is an exploded perspective view of the preferred embodiment of a modular portable computer according to the present invention.
Figure 2:
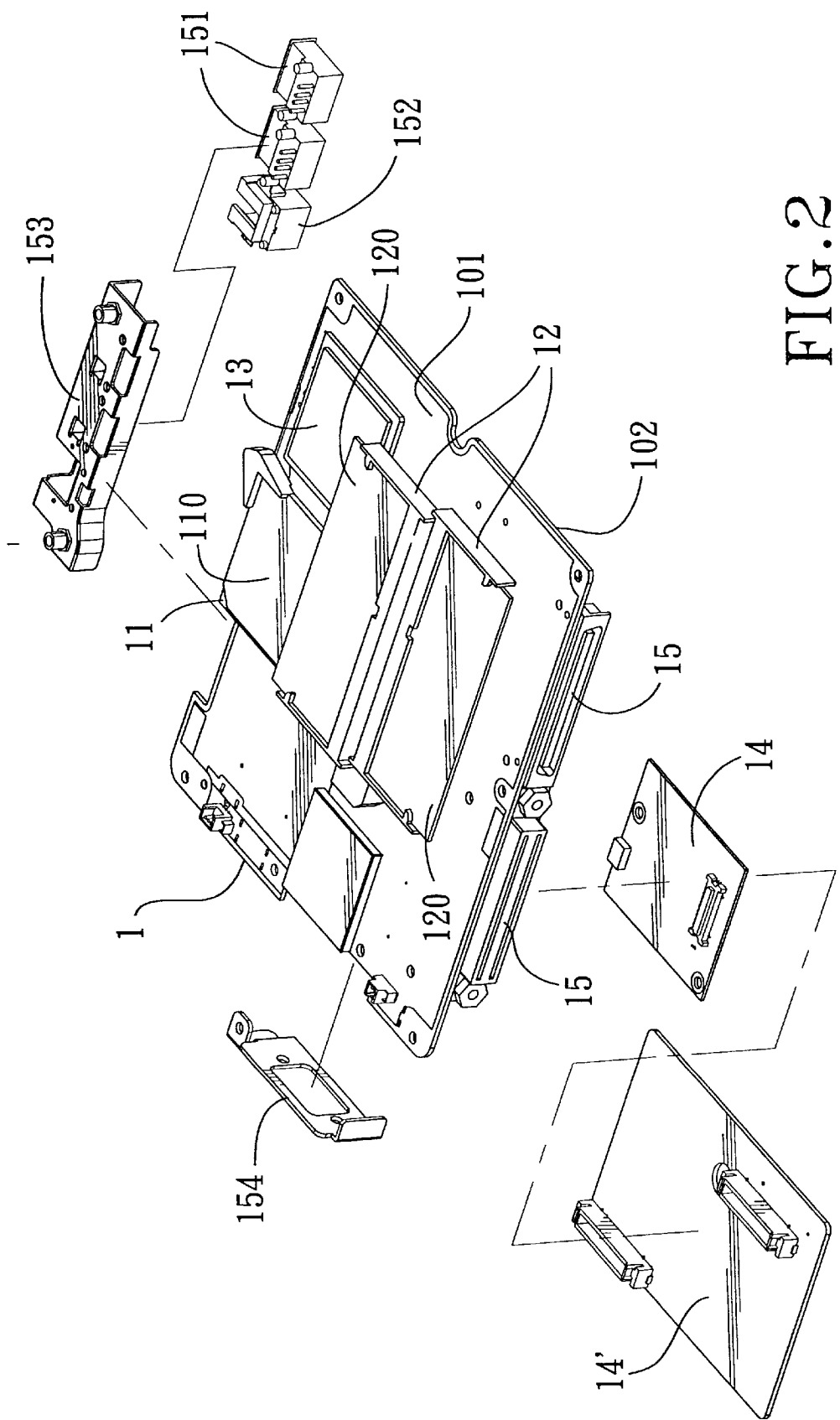
FIG. 2 is an exploded perspective view showing a base board unit of the preferred embodiment.

With reference to FIG. 2, the base board unit 1 has a first printed circuit surface 101, and a second printed circuit surface 102 opposite to the first printed circuit surface 101. The first printed circuit surface 101 has a processor socket 11 and a pair of memory sockets 12 mounted thereon and connected electrically thereto. A processing unit 110 is mounted removably on and is connected electrically to the processor socket 11. Each of a pair of memory modules 120 is mounted removably on and is connected electrically to a respective one of the memory sockets 12. Preferably, the memory sockets 12 open in opposite directions and permit the memory modules 120 to lie parallel to the first printed circuit surface 101 so as not to introduce a substantial increase in the thickness of the portable computer when the memory modules 120 are mounted on the memory sockets 12. In addition, an audio-video chipset 13, which incorporates the functions of a display card and a sound card, is mounted on the first printed circuit surface 101 adjacent to the processor socket 11, and is in electrical connection with the first printed circuit surface 101.

To further enhance the functionality of the base board unit 1, a first daughter circuit board 14, such as a modem card, is mounted removably on the second printed circuit surface 102 such that the first daughter circuit board 14 lies parallel to the second printed circuit surface 102 and is connected electrically thereto. A second daughter circuit board 14', such as a power controller card, can be similarly mounted on and connected electrically to the second printed circuit surface 102 such that the first and second daughter circuit boards 14, 14' are in a stacked arrangement to result in a compact structure. Preferably, a sponge layer (not shown) is disposed between the first and second daughter circuit boards 14, 14' to prevent short-circuiting therebetween.

In addition, a signal input/output connector set 15 is mounted on the base board unit 1 and is connected electrically to at least one of the first and second printed circuit surfaces 101, 102. The signal input/output connector set 15 can include a VGA connector for a computer monitor, a USB connector, an RJ11 signal connector, a loudspeaker jack, a microphone input jack, a power source connector, and a data transmission socket. In the preferred embodiment, two USB connectors 151 and an RJ11 signal connector 152 are mounted on a connector frame 153 which, in turn, is secured to an edge portion of the base board unit 1. A VGA connector frame 154 is secured on another edge portion of the base board unit 1 for mounting a VGA connector (not shown) thereon.

Figure 3:
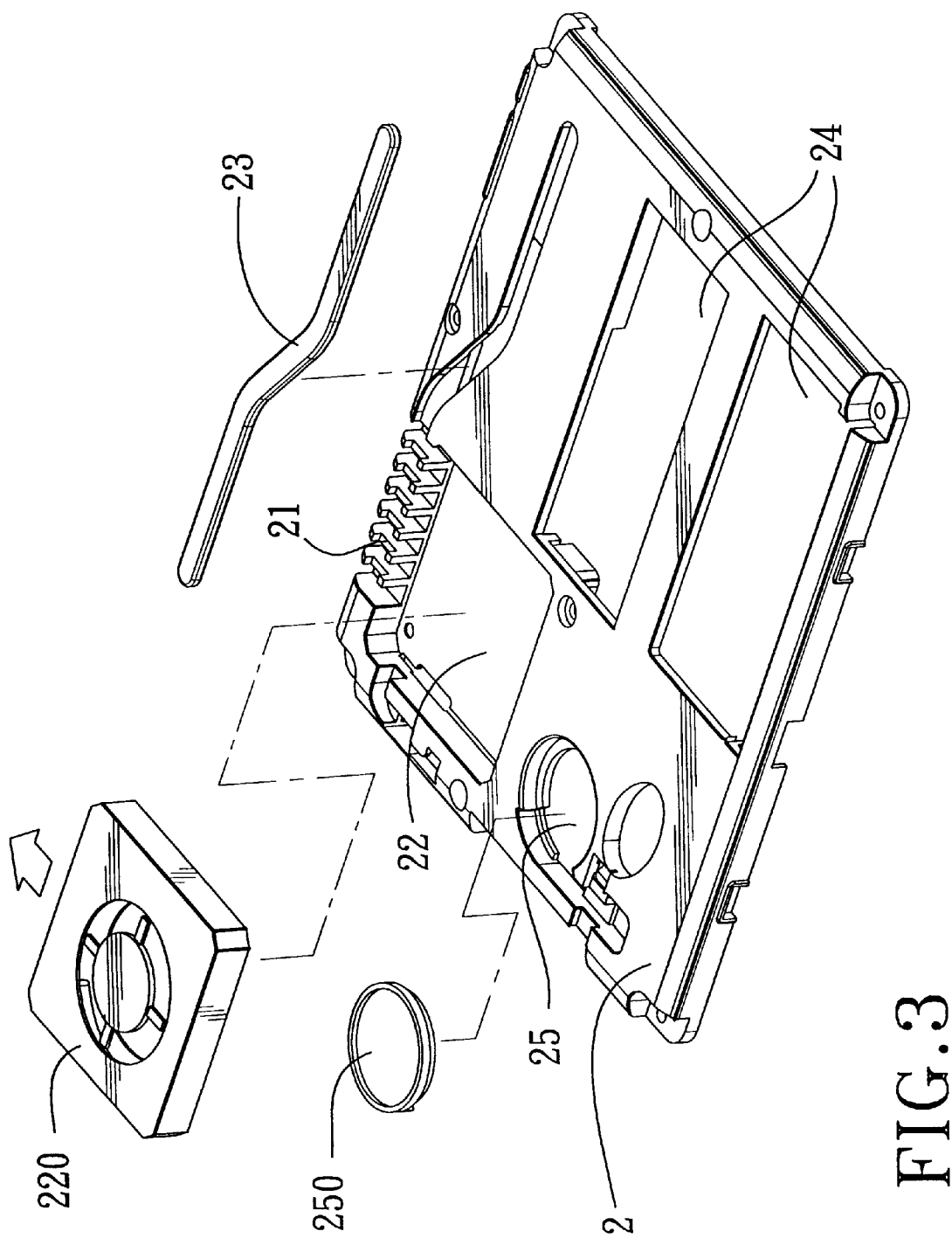
FIG. 3 is an exploded perspective view showing an inner frame member of the preferred embodiment.

With reference to FIG. 3, the inner frame member 2 is superimposed on the first printed circuit surface 101 of the base board unit 1, and includes a heat-dissipating portion 21, a fan-mounting cavity 22, a heat-dissipating fan 220, and a heat-conducting pipe 23. The heat-dissipating portion 21, in the form a heat sink, is adapted to dissipate heat to the atmosphere. The heat-dissipating fan 220 is mounted in the fan-mounting cavity 22. The heat-conducting pipe 23 has one end disposed to contact the processing unit 110 and the audio-video chipset 13, and an opposite end disposed to connect with the heat-dissipating portion 21 so as to transmit heat generated by the processing unit 110 and the audio-video chipset 13 to the heat-dissipating portion 21. The heat-dissipating fan 220 is connected electrically to the base board unit 1 and is operable so as to blow cooling air toward the heat-dissipating portion 21 so as to dissipate heat generated by the processing unit 110 and the audio-video chipset 13. The inner frame member 2 is further formed with a pair of access holes 24 that are registered with the memory modules 120 on the base board unit 1, thereby permitting installation and replacement of the memory modules 120 without disassembling the inner frame member 2. The inner frame member 2 is further formed with a loudspeaker-receiving cavity 25, and has a loudspeaker 250 mounted in the loudspeaker-receiving cavity 25 and connected electrically to the base board unit 1 for sound reproduction purposes.

Figure 4:
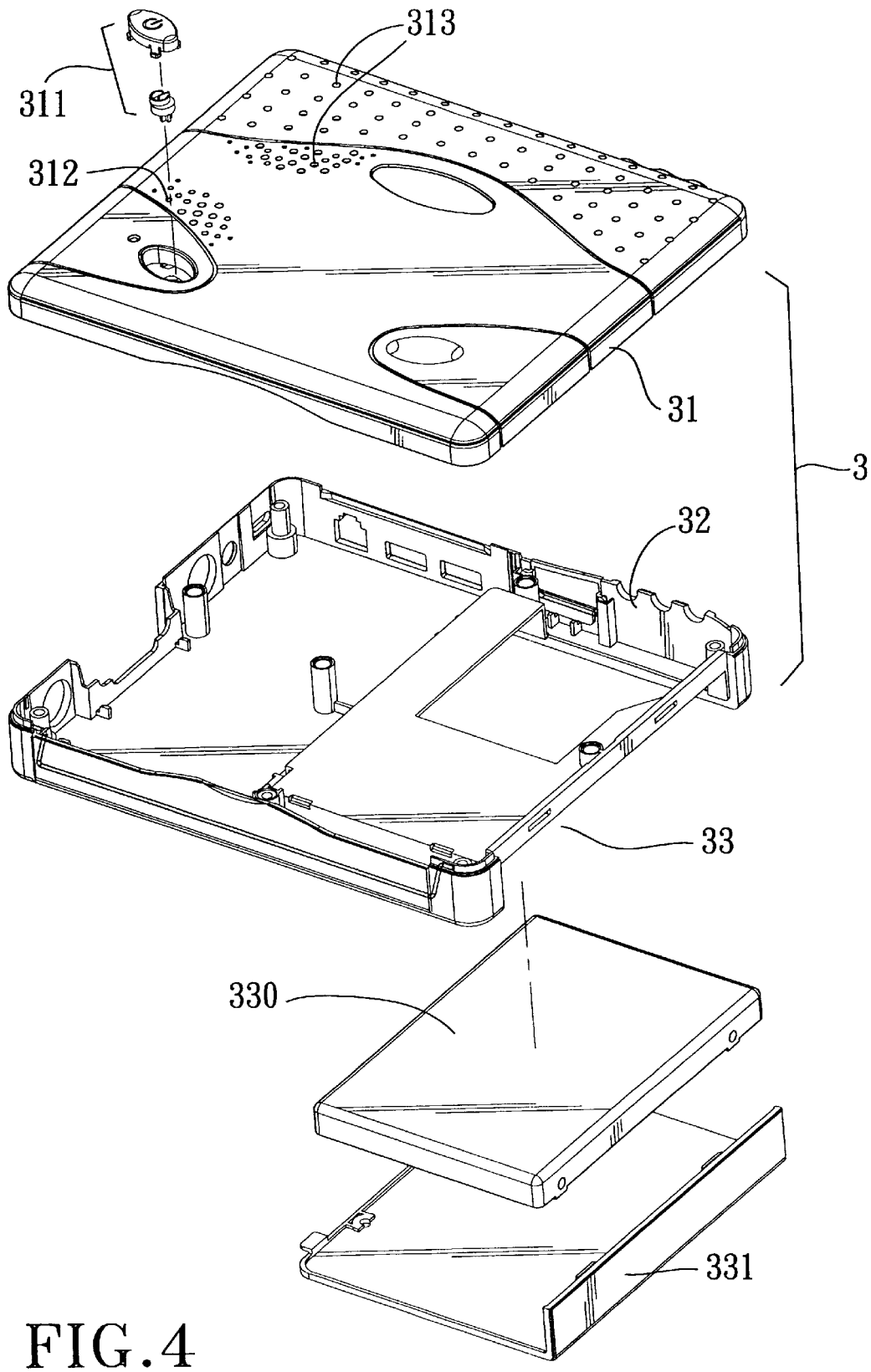
FIG. 4 is an exploded perspective view showing a casing unit of the preferred embodiment.

With reference to FIG. 4, the casing unit 3 includes an upper casing part 31 and a lower casing part 32 that is connected removably to the upper casing part 31. The casing parts 31, 32 cooperate to confine a compartment that receives assembly of the base board unit 1, the inner frame member 2, and the various components on the base board unit land the inner frame member 2, and permit the signal input/output connector set 15 to be accessible externally of the casing unit 3 so as to permit connection of external peripheral equipment (not shown) thereto. The lower casing part 32 has one side formed with a receiving space 33 for receiving a data storage medium 330, such as a hard disk drive, that is to be connected electrically to the base board unit 1. A cover 331 is mounted on the lower casing part 32 to close the receiving space 33. A power switch 311 is mounted on the upper casing part 31, and is connected electrically to the base board unit 1 for controlling the supply of electric power to the base board unit 1. The upper casing part 31 is further formed with a plurality of sound holes 312 that are aligned with the loudspeaker 250 on the inner frame member 2 such that sound generated by the loudspeaker 250 can be audibly transmitted to the exterior of the casing unit 3. The upper casing part 31 further has a plurality of vent holes 313 that are aligned with at least one of the heat-dissipating fan 220 and the heat-conducting pipe 23 for introducing cooling air into the casing unit 3.

Figure 5:
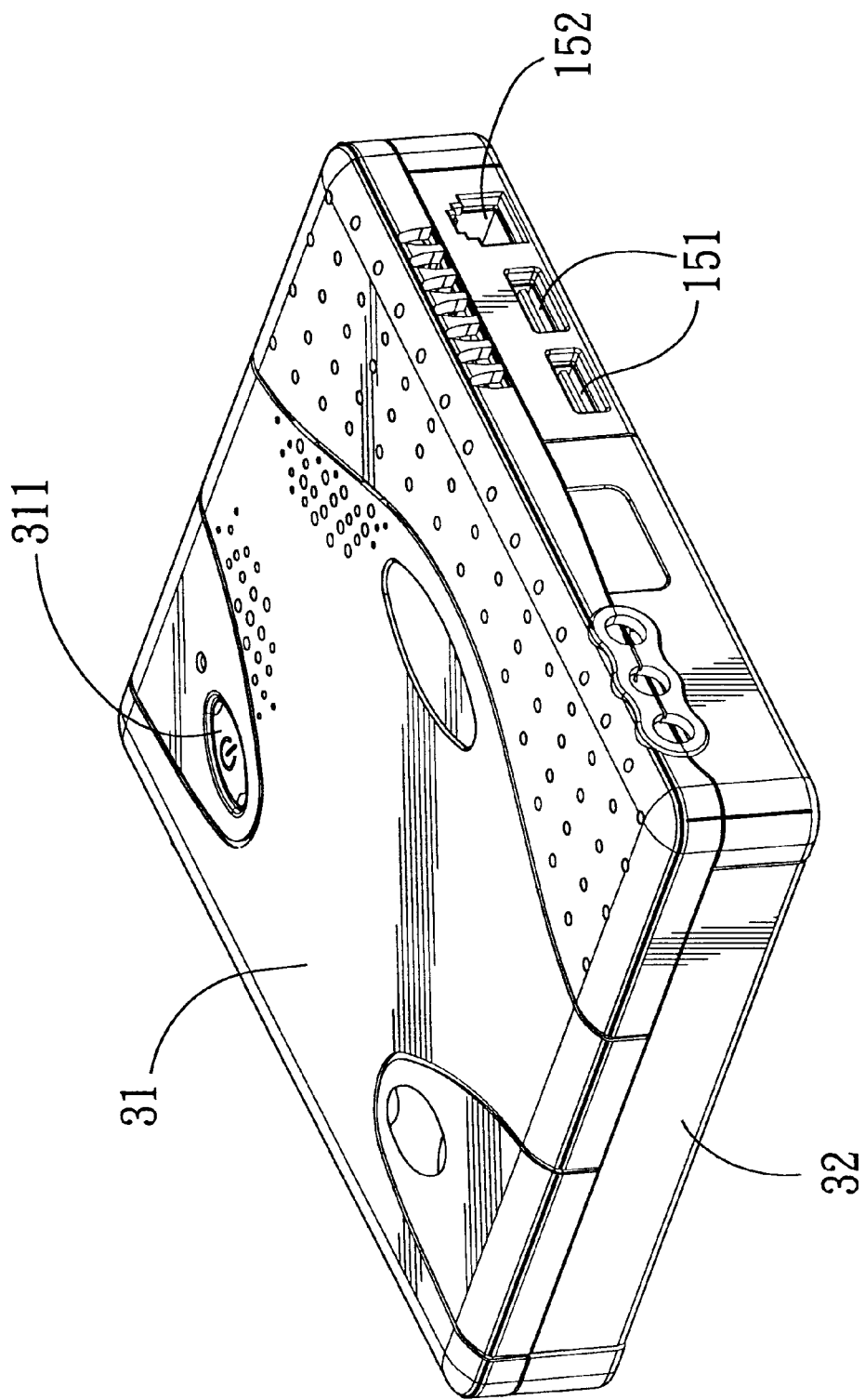
FIG. 5 is an assembled perspective view of the preferred embodiment.

With reference to FIG. 5, as compared to a conventional notebook computer, the modular portable computer of this invention does not include a built-in computer monitor and computer keyboard, thereby resulting in a substantially smaller size and lighter weight that facilitates carrying of the same from one place to another. The modular portable computer is designed for convenient connection to standard peripheral equipment, such as a computer monitor, a computer keyboard, a computer printer, etc. To upgrade the modular portable computer, the upper casing part 31 is removed from the lower casing part 32 to permit installation and replacement of the memory modules 120. The inner frame member 2 is removed when it is desired to replace the processing unit 110.

It has thus been shown that the modular portable computer of this invention incorporates data processing and storage functions, is small in size and is lightweight to facilitate carrying thereof, and can be easily connected to standard peripheral equipment of a desktop computer, such as a computer monitor, a computer keyboard, a computer printer, etc. The modular portable computer of this invention can also be upgraded with relative ease.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A modular portable computer, comprising:

a base board unit having a first printed circuit surface and a second printed circuit surface opposite to said first printed circuit surface, said first printed circuit surface having a processor socket and at least one memory socket mounted thereon and connected electrically thereto, said processor socket having a processing unit mounted removably thereon and connected electrically thereto, said memory socket having a respective memory module mounted removably thereon and connected electrically thereto, said base board unit further having a signal input/output connector set mounted thereon and connected electrically to at least one of said first and second printed circuit surfaces;

an inner frame member superimposed on said first printed circuit surface of said base board unit, said inner frame member including a heat-dissipating portion, a fan-mounting cavity, a heat-dissipating fan mounted in said fan-mounting cavity, and a heat-conducting pipe having one end disposed to contact said processing unit and an opposite end connected to said heat-dissipating portion so as to transmit heat generated by said processing unit to said heat-dissipating portion, said heat-dissipating fan being operable so as to blow cooling air toward said heat-dissipating portion; and a casing unit including an upper casing part and a lower casing part connected removably to said upper casing part, said upper and lower casing parts cooperating to confine a compartment that receives assembly of said base board unit and said inner frame member therein, and permitting said signal input/output connector set to be accessible externally of said casing unit so as to permit connection of external peripheral equipment to said signal input/output connector set, said lower casing part being formed with a receiving space that receives a data storage medium therein, said data storage medium being connected electrically to said base board unit.

2. The modular portable computer of claim 1, wherein said base board unit further includes a daughter circuit board mounted removably on and connected electrically to one of said first and second printed circuit surfaces.

3. The modular portable computer of claim 2, wherein said daughter circuit board lies parallel to said one of said first and second printed circuit surfaces.

4. The modular portable computer of claim 1, wherein said memory module lies parallel to said first printed circuit surface when mounted on said memory socket.

5. The modular portable computer of claim 1, wherein said data storage medium includes a hard disk drive.

6. The modular portable computer of claim 1, wherein said inner frame member is formed with an access hole to permit installation and removal of said memory module on and from said memory socket via said inner frame member.

7. The modular portable computer of claim 1, wherein said upper casing part has a power switch mounted thereon and connected electrically to said base board unit for controlling supply of electric power to said base board unit.

8. The modular portable computer of claim 1, wherein said inner frame member further has a loudspeaker-receiving cavity, and a loudspeaker mounted in said loudspeaker-receiving cavity and connected electrically to said base board unit.

* * * * *

UNITED STATES PATENT AND TRADEMARK OFFICE
CERTIFICATE OF CORRECTION

PATENT NO. : 6,504,711 B2
DATED : January 7, 2003
INVENTOR(S) : Yu-Ho Wu et al.

It is certified that error appears in the above-identified patent and that said Letters Patent is hereby corrected as shown below:

Title page,
Item [73], delete "Tao-Yen" and substitute -- Tao-Yuan -- in its place.

Signed and Sealed this

Fourth Day of November, 2003

JAMES E. ROGAN
*Director of the United States Patent and Trademark Office*